(12) United States Patent
Esteghlal

(10) Patent No.: US 11,876,442 B2
(45) Date of Patent: Jan. 16, 2024

(54) CONTROL DEVICE FOR A DC-DC CONVERTER, DC-DC CONVERTER AND METHOD FOR THE CLOSED-LOOP CONTROL OF A DC-DC CONVERTER

(71) Applicant: Robert Bosch GmbH, Stuttgart (DE)

(72) Inventor: Gholamabas Esteghlal, Stuttgart-Weilimdorf (DE)

(73) Assignee: Robert Bosch GmbH, Stuttgart (DE)

( * ) Notice: Subject to any disclaimer, the term of this patent is extended or adjusted under 35 U.S.C. 154(b) by 53 days.

(21) Appl. No.: 17/637,869

(22) PCT Filed: Aug. 10, 2020

(86) PCT No.: PCT/EP2020/072373
§ 371 (c)(1),
(2) Date: Feb. 24, 2022

(87) PCT Pub. No.: WO2021/037540
PCT Pub. Date: Mar. 4, 2021

(65) Prior Publication Data
US 2022/0278610 A1    Sep. 1, 2022

(30) Foreign Application Priority Data
Aug. 30, 2019  (DE) .................. 10 2019 213 065.8

(51) Int. Cl.
*H02M 3/04* (2006.01)
*H02M 1/00* (2006.01)
*H02M 1/14* (2006.01)

(52) U.S. Cl.
CPC .......... *H02M 3/04* (2013.01); *H02M 1/0009* (2021.05); *H02M 1/0016* (2021.05); *H02M 1/14* (2013.01)

(58) Field of Classification Search
CPC .... H02M 3/04; H02M 1/0009; H02M 1/0016; H02M 1/14
See application file for complete search history.

(56) References Cited

U.S. PATENT DOCUMENTS

| | | | |
|---|---|---|---|
| 2018/0050603 A1* | 2/2018 | Hand, III | H02J 7/0018 |
| 2019/0387602 A1* | 12/2019 | Woywode | H05G 1/32 |
| 2022/0368224 A1* | 11/2022 | Chun | H02M 3/156 |

FOREIGN PATENT DOCUMENTS

| | | |
|---|---|---|
| DE | 102013111988 A1 | 5/2014 |
| DE | 102016215147 A1 | 2/2018 |
| DE | 102016219740 A1 | 4/2018 |

OTHER PUBLICATIONS

Translation of International Search Report for Application No. PCT/EP2020/072373 dated Sep. 17, 2020 (2 pages).

* cited by examiner

*Primary Examiner* — Kyle J Moody
*Assistant Examiner* — Lakaisha Jackson
(74) *Attorney, Agent, or Firm* — Michael Best & Friedrich LLP

(57) ABSTRACT

The present invention relates to advanced control for a DC-to-DC converter. For this purpose, in the determination of a controlled variable for the control of the DC-to-DC converter, the control dynamics are adjusted according to an electric current through the DC-to-DC converter. In particular, it is possible to determine the controlled variable from a combination of a first controlled variable of a voltage controller and a second controlled variable of a feedforward control. In particular, the control dynamics of the feedforward control can be adjusted according to the electric current through the DC-to-DC converter. By adjusting the control dynamics according to current, it is possible to minimize possible current ripple on the output side.

9 Claims, 3 Drawing Sheets

CONTROL DEVICE FOR A DC-DC CONVERTER, DC-DC CONVERTER AND METHOD FOR THE CLOSED-LOOP CONTROL OF A DC-DC CONVERTER

BACKGROUND OF THE INVENTION

The present invention relates to a control device for a DC-DC converter, a DC-DC converter having such closed-loop control and a method for the closed-loop control of a DC-DC converter.

DC-DC converters are used for numerous application areas. For example, DC-DC converters can be used to transmit electrical energy from a high-voltage power supply system of an electric vehicle to a low-voltage power supply system of the electric vehicle. For example, a transformer can be provided between an input side and an output side of the DC-DC converter in order to DC-decouple the input side from the output side. Furthermore, various closed-loop control methods exist for setting and regulating the electrical voltage on the output side of the DC-DC converter.

Document DE 10 2016 219 740 A1 describes closed-loop control for a DC-DC converter having a plurality of DC-DC converter modules connected in parallel. In this case, a first controlled variable is determined jointly for all of the DC-DC converter modules, and a further controlled variable is determined individually for each DC-DC converter module. The individual DC-DC converter modules are thereupon driven using a combination of the common controlled variable and the individual controlled variable.

SUMMARY OF THE INVENTION

The present invention discloses a control device for a DC-DC converter, a DC-DC converter and a method for the closed-loop control of a DC-DC converter having the features of the independent patent claims. Further embodiments are the subject matter of the dependent patent claims.

Accordingly, the following is provided:

A control device for a DC-DC converter comprising a voltage regulator and a feedforward control device. The voltage regulator is designed to generate a first controlled variable. The first controlled variable is determined in particular using a setpoint value for the output voltage of the DC-DC converter and a determined value for the output voltage of the DC-DC converter. The feedforward control device is designed to generate a second controlled variable. The second controlled variable is determined in particular using the setpoint value for the output voltage of the DC-DC converter, a determined value for the input voltage of the DC-DC converter and a determined value for an electrical current in the DC-DC converter. In this case, the feedforward control device is designed to adapt a dynamic response of the control system for the generation of the second controlled variable depending on the determined value for the electrical current in the DC-DC converter. The control device is further designed to be coupled to a DC-DC converter and to provide a combination of the first controlled variable and the second controlled variable at the DC-DC converter.

Furthermore, the following is provided:

A DC-DC converter comprising at least one DC-DC converter module and a control device according to the invention. The DC-DC converter module is in particular designed to convert a DC input voltage into a DC output voltage. In this case, the DC-DC converter module can implement the conversion of the DC voltage using the combination of first controlled variable and second controlled variable provided by the control device.

Finally, the following is provided:

A method for the closed-loop control of a DC-DC converter. The method comprises a step for generating a first controlled variable. The first controlled variable is determined in particular using a setpoint value for the output voltage of the DC-DC converter and a determined value for the output voltage of the DC-DC converter. Furthermore, the method comprises a step for generating a second controlled variable. The second controlled variable is determined in particular using the setpoint value for the output voltage of the DC-DC converter, a determined value for the input voltage of the DC-DC converter and a determined value for an electrical current in the DC-DC converter. Finally, the method comprises a step for providing a combination of the first controlled variable and the second controlled variable at the DC-DC converter. In this case, a dynamic response of the control system can be adapted for the determination of the second controlled variable depending on the determined value for the electrical current in the DC-DC converter.

The present invention is based on the knowledge that extensive electrical interference can occur at an output of a DC-DC converter. This electrical interference can be caused, for example, by consumers connected on the output side of the DC-DC converter. Furthermore, other sources of interference are also possible which may be responsible for interference, for example current ripple or the like, on the output side of the DC-DC converter. For example, a charger can be connected in a low-voltage power supply system of an electric vehicle in order to charge a battery, for example a 12 volt battery, which is present in the low-voltage power supply system of the electric vehicle. In this case, high-frequency interference and/or significant voltage fluctuations can occur. Such interference can influence the operational response of consumers which are connected to a DC voltage power supply system on the output side of the DC-DC converter.

On the input side of the DC-DC converter, in this case current ripple which occurs on the output side cannot be detected, or at least can only be detected with difficulty, owing to high capacitances on the input side. Therefore, one concept of the present invention consists in taking this knowledge into consideration and providing closed-loop control for a DC-DC converter which can counteract possible interference, in particular current ripple, on the output side of a DC-DC converter.

For this purpose, it is provided according to the invention for the dynamic response of the control system to be adapted during the closed-loop control of the DC-DC converter depending on an electrical current through the DC-DC converter. In particular, for this purpose, two separate control elements are provided. A voltage regulator can in this case generate a first controlled variable independently of the electrical current through the DC-DC converter. Furthermore, a second controlled variable can be generated, for example by means of a feedforward control device, which second controlled variable takes into consideration the electrical current through the DC-DC converter. In order to counteract current ripple occurring in this case on the output side of the DC-DC converter, the dynamic response of the control system of the second control element, for example the feedforward control device, can be adapted dynamically depending on the electrical current through the DC-DC converter. As a result, current ripple occurring on the output side of the DC-DC converter can be reliably weakened. The dynamic response of the control system of the feedforward control device can in this case in particular specify the dependence of the second controlled variable to be determined on the input voltage and/or the setpoint voltage to be achieved.

Owing to the current-dependent adaptation of the dynamic response of the control system for the closed-loop control of a current regulator, it is possible to significantly minimize current ripple and further interference on the output side of the DC-DC converter. As a result, operational faults and damage to assemblies, in particular electrical assemblies which are connected to a power supply system at the output of the DC-DC converter, can be avoided.

In accordance with one embodiment, the feedforward control device is designed to generate a controlled variable using the setpoint value for the output voltage of the DC-DC converter and the determined value for the input voltage of the DC-DC converter. Furthermore, this generated controlled variable can be multiplied by a preset factor. In this case, the preset factor can be adapted depending on the determined value for the electrical current in the DC-DC converter. For example, a relationship between the electrical current in the DC-DC converter and the preset factor can be defined. As a result, during operation of the DC-DC converter, a suitable factor can be calculated continuously using the preset function, and the thus calculated factor can be used for determining the second controlled variable. Furthermore, any other desired methods for determining the factor depending on the electrical current in the DC-DC converter are also possible. For example, values for the factor can also be calculated and stored in advance in the form of a lookup table or the like.

In accordance with one embodiment, the feedforward control device is designed to reduce the dynamic response of the control system for the generation of the second controlled variable when the determined value for the electrical current in the DC-DC converter rises. Correspondingly, the feedforward control device can be designed to step up the dynamic response of the control system for the generation of the second controlled variable when the determined value for the electrical current in the DC-DC converter decreases. In this way, as the electrical current in the DC-DC converter rises, the dynamic response of the control system can be reduced in order, in this way, to counteract possible interference and in particular current ripple on the output side of the DC-DC converter. Thus, for example, as currents through the DC-DC converter rise, the dependency of the second controlled variable on the input voltage and/or setpoint voltage can be weakened.

In accordance with one embodiment, the feedforward control device is designed to generate the second controlled variable using a transformation ratio of a transformer in the DC-DC converter. In this way, given a known transformation ratio in the DC-DC converter, it is possible to draw a conclusion on an output voltage to be expected from an input voltage at the DC-DC converter, and for this relationship to be included in the closed-loop control process as well.

In accordance with one embodiment, the feedforward control device is designed to adapt the second controlled variable depending on an active operating mode of the DC-DC converter. In particular, the calculation of the second controlled variable can be implemented differently in a boost converter mode than in a buck converter.

In one embodiment of the DC-DC converter, the DC-DC converter comprises a plurality of DC-DC converter modules. In this case, it may be possible to provide an individual current regulation for each module of the DC-DC converter in addition to a common calculation of the first and second controlled variables.

The above configurations and developments can be combined with one another as desired, insofar as is sensible. Further configurations, developments and implementations of the invention also include combinations which have not been explicitly mentioned of features of the invention described above or below in relation to the exemplary embodiments. In particular, a person skilled in the art will in this case also add individual aspects as improvements or additions to the respective basic forms of the invention.

BRIEF DESCRIPTION OF THE DRAWINGS

Further features and advantages of the present invention are explained below with reference to the figures, in which.

DETAILED DESCRIPTION

Figure 1:
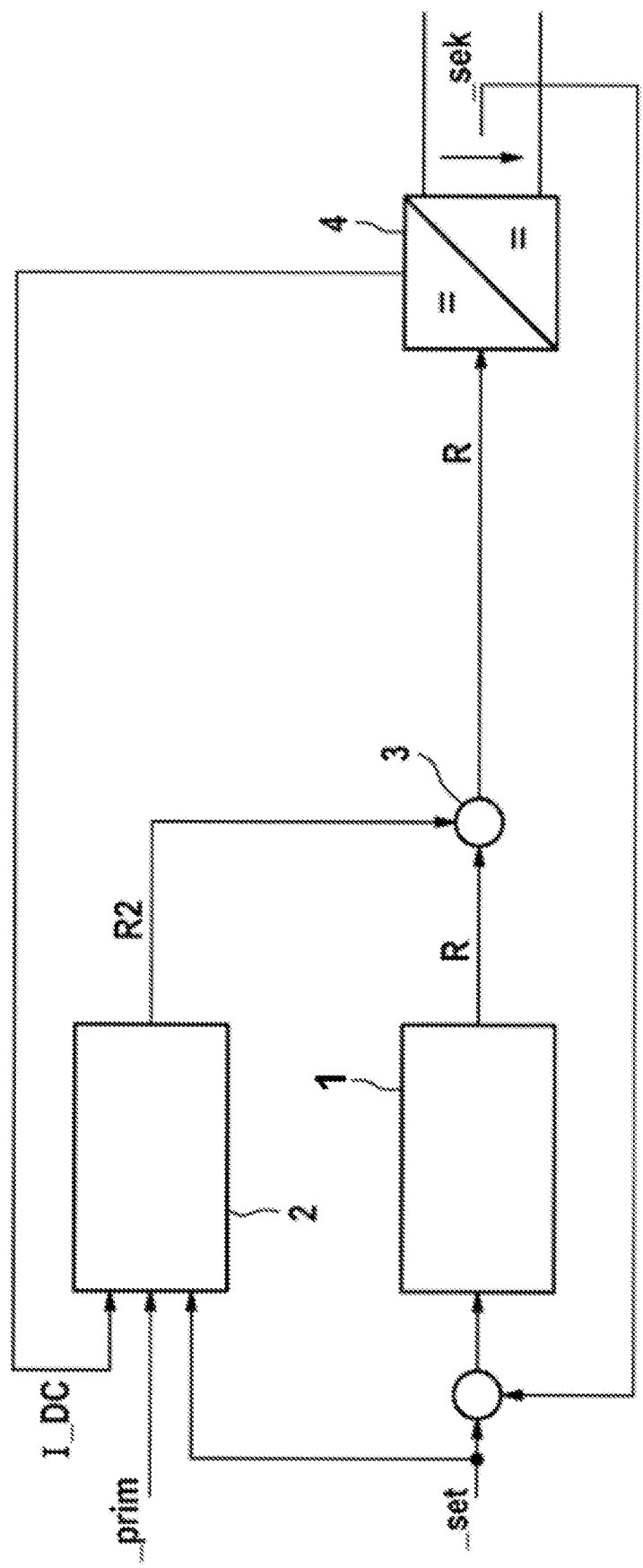
FIG. 1 shows a schematic illustration of a block circuit diagram of a control device of a DC-DC converter in accordance with one embodiment.

FIG. 1 shows a schematic illustration of a block circuit diagram of a DC-DC converter having a control device in accordance with one embodiment. The DC-DC converter comprises one or more DC-DC converter modules 4, which convert a DC input voltage into a DC output voltage. The DC-DC converter module 4 can in this case comprise a transformer (not explicitly illustrated), for example. This enables, for example, DC-isolation between the input terminal and the output terminal. In this case, the transformer can have a transformation ratio N between the primary side and the secondary side. For example, such a DC-DC converter can transmit electrical energy from a high-voltage power supply system of an electric vehicle to a low-voltage power supply system of the electric vehicle. However, any other desired application cases for a unidirectional or bidirectional DC-DC converter are in principle also possible.

As can be seen from FIG. 1, the DC-DC converter module 4 is subjected to closed-loop control using a controlled variable R. The controlled variable R is formed from the two controlled variables R1 and R2. For this purpose, the two controlled variables R1 and R2 can be supplied, for example, to a summation element 3, which generates, as controlled variable R, a combination of the first controlled variable R1 and the second controlled variable R2 and supplies it to the DC-DC converter module 4.

The first controlled variable R1 is generated, for example, by means of a voltage regulator 1. For this purpose, the voltage regulator 1 can determine the first controlled variable R1, for example, from a comparison of a preset setpoint voltage U_set and the present output voltage U_sek. For example, for this purpose, the voltage regulator 1 can form a difference between the setpoint voltage U_set and the present output voltage U_sek.

The second variable R2 is formed by means of a feedforward control device 2. In particular, the second controlled variable R2 is formed using the input voltage U_prim at the input of the DC-DC converter, the preset setpoint voltage U_set and the electrical current I_DC in the DC-DC converter module 4. For this purpose, the electrical current can be measured, for example, at the input of the DC-DC converter module 4.

The feedforward control device 2 can in this case adapt the dynamic response of the control system for the generation to the second controlled variable R2 depending on the electrical current I_DC in the DC-DC converter. For example, as the electrical current I_DC in the DC-DC converter rises, the dynamic response of the control system can be reduced. In this way, the fluctuations in the second controlled variable R2 in the case of a higher current I_DC in the DC-DC converter are lower than in the case of a relatively low current I_DC in the DC-DC converter. For example, the dynamic response of the control system can be adapted depending on a preset factor. This factor can be adapted, for example, based on a function which is dependent on the electrical current I_DC in the DC-DC converter. In this way, the factor can be calculated at any time by means of the preset function. Alternatively, any other desired schemes for determining a suitable factor are also possible. For example, the factor can also be determined in the form of a lookup table depending on the electrical current I_DC through the voltage converter.

Figure 2:
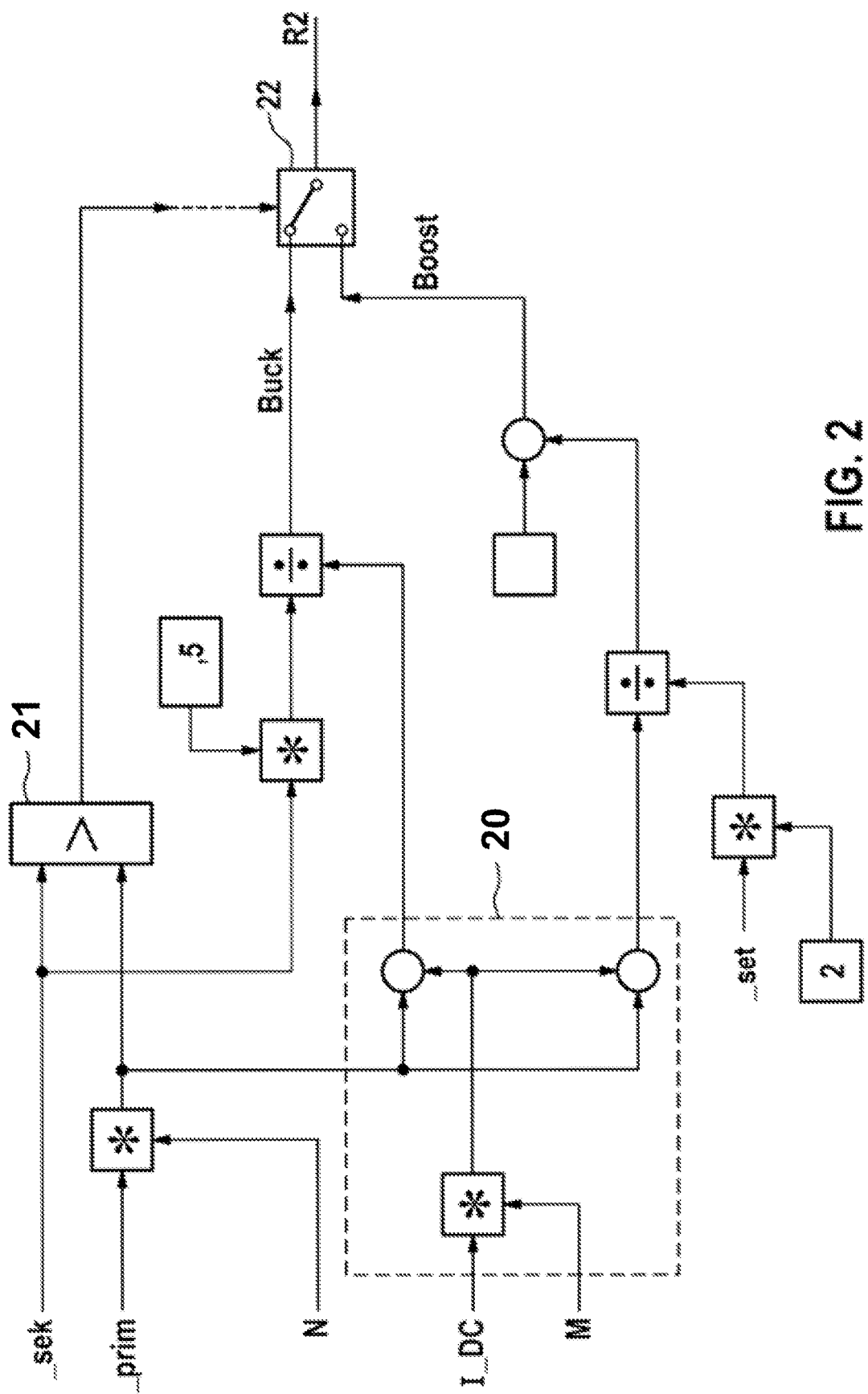
FIG. 2 shows a schematic illustration of a block circuit diagram of a feedforward control device for a control device in accordance with one embodiment.

FIG. 2 shows a schematic illustration of a block circuit diagram which describes, by way of example, a possible embodiment of a feedforward control device 2. First of all, it is possible to decide between a boost converter operating mode and a buck converter operating mode. For this purpose, the electrical voltage on the output side and the product of the electrical voltage on the input side and the transformation ratio of a transformer in the DC-DC converter are supplied to a comparison device 21. If, during this comparison, it results that the output voltage U_set to be achieved is higher than the input voltage U_prim multiplied by the transformation ratio N of the transformer, the DC-DC converter is operated in the boost converter operating mode. Alternatively, the DC-DC converter is operated in the buck converter operating mode when the output voltage U_set to be achieved is lower than the product of the input voltage U_prim and the transformation ratio N of the transformer. The result of this comparison is supplied from the comparison device 21 to the switching element 22 for this purpose. The switching element 22 can select, corresponding to the result of the comparison, between the controlled variable for the boost converter operating mode and the controlled variable for the buck converter operating mode.

Furthermore, the feedforward control device 2 comprises a device 20 for adapting the dynamic response of the control system in the feedforward control device 2. As can be seen from FIG. 2, the dynamic response of the control system of the feedforward control device 2 can be adapted depending on the electrical current I_DC in the DC-DC converter module. For this purpose, the determined electrical current I_DC can be weighted with a multiplier M. The product of the multiplier M and the electrical current I_DC of the DC-DC converter module 4 can thereupon also be used in the closed-loop control process. For example, this product can be used together with the input voltage U_prim, which has been multiplied, if appropriate, by the transformation ratio N of the transformer, for the determination of the controlled variable in the boost converter operating mode and/or buck converter operating mode.

The multiplier M can be selected depending on different boundary conditions or state variables. For example, the multiplier M can be selected depending on various operating modes of the DC-DC converter module 4, the input or output voltage of the DC-DC converter module or else other factors.

Figure 3:
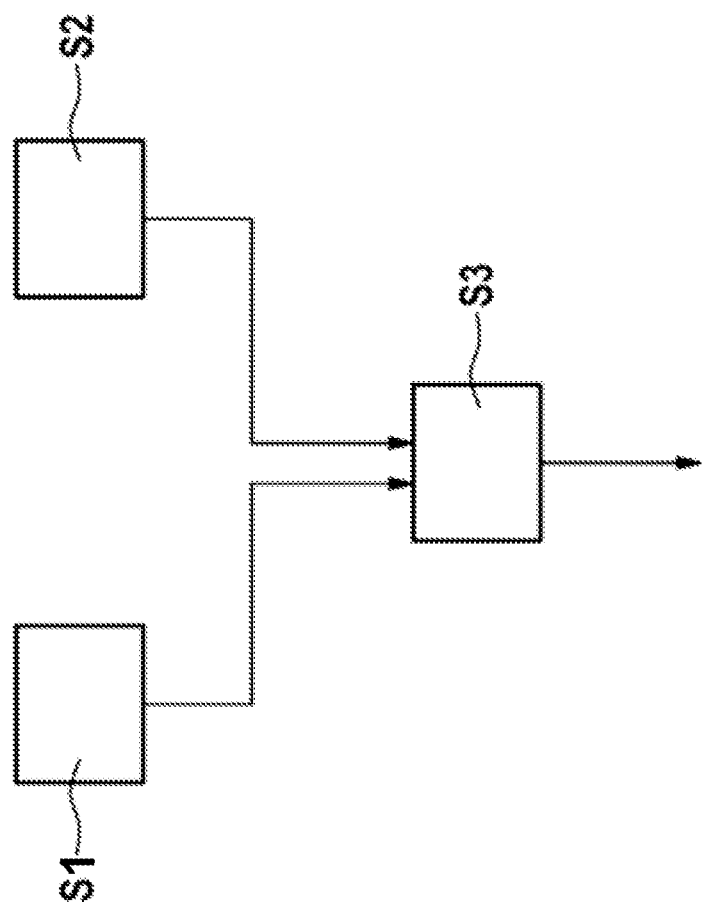
FIG. 3 shows a flowchart, as forms the basis of a method for the closed-loop control of a DC-DC converter.

FIG. 3 shows a schematic illustration of a flowchart, as forms the basis of a method for the closed-loop control of a DC-DC converter in accordance with one embodiment. In step S1, a first controlled variable R1 is generated. The first controlled variable R1 can be determined using a setpoint value U_set for the output voltage of the DC-DC converter and a determined value U_sek for the output voltage of the DC-DC converter. In step S2, a second controlled variable R2 is generated. The second controlled variable R2 can be determined using the setpoint value U_set for the output voltage of the DC-DC converter, a determined value U_prim for the input voltage of the DC-DC converter and a determined value I_DC for an electrical current in the DC-DC converter. The first controlled variable R1 and the second controlled variable R2 can be combined, and, in step S3, the DC-DC converter can be driven using the combination of the first controlled variable R1 and the second controlled variable R2.

In order to determine the second controlled variable R2, the dynamic response of the control system can be adapted depending on the determined value for the electrical current I_DC in the DC-DC converter.

Furthermore, the method can also implement all of the steps as have already been described in connection with the closed-loop control of the DC-DC converter.

By way of summary, the present invention relates to extended closed-loop control for a DC-DC converter. For this purpose, the dynamic response of the control system is adapted depending on an electrical current through the DC-DC converter during the determination of a controlled variable for the closed-loop control of the DC-DC converter. In particular, it is possible to determine the controlled variable from a combination of a first controlled variable from a voltage regulator and a second controlled variable from feedforward control. In this case, in particular the dynamic response of the control system of the feedforward control device can be adapted depending on the electrical current through the DC-DC converter. By virtue of the current-dependent adaptation of the dynamic response of the control system, it is possible to minimize current ripple which may occur on the output side.

The invention claimed is:

1. A control device for a DC-DC converter, the control device comprising:
    a voltage regulator (1), which is configured to generate a first controlled variable (R1) using a setpoint value (U_set) for the output voltage of the DC-DC converter and a determined value (U_sek) for the output voltage of the DC-DC converter; and
    a feedforward control device (2), which is configured to generate a second controlled variable (R2) using the setpoint value (U_set) for the output voltage of the DC-DC converter, a determined value (U_prim) for the input voltage of the DC-DC converter and a determined value (I_DC) for an electrical current in the DC-DC converter,
    wherein the feedforward control device (2) is configured to adapt a dynamic response of the control system for the generation of the second controlled variable (R2) depending on the determined value (I_DC) for the electrical current in the DC-DC converter; and wherein the control device is configured to provide a combination (R) of the first controlled variable (R1) and the second controlled variable (R2) at the DC-DC converter.

2. The control device as claimed in claim 1, wherein the feedforward control device (2) is configured to generate an internal controlled variable using the setpoint value (U_set) for the output voltage of the DC-DC converter and the determined value (U_prim) for the input voltage of the DC-DC converter and to multiply the generated internal controlled variable by a preset factor, wherein the preset factor is adapted depending on the determined value (I_DC) for the electrical current in the DC-DC converter.

3. The control device as claimed in claim 1 or 2, wherein the feedforward control device (2) is configured to reduce the dynamic response of the control system for the generation of the second controlled variable (R2) when the determined value (I_DC) for the electrical current in the DC-DC converter rises.

4. The control device as claimed in claim 1, wherein the feedforward control device (2) is configured to generate the second controlled variable (R2) using a transformation ratio of a transformer in the DC-DC converter.

5. The control device as claimed in claim 1, wherein the feedforward control device (2) is configured to adapt the second controlled variable (R2) depending on an active operating mode of the DC-DC converter.

6. A DC-DC converter, comprising:
  a DC-DC converter module (4), which is configured to convert a DC input voltage into a DC output voltage, and
  a control device including
  a voltage regulator (1), which is configured to generate a first controlled variable (R1) using a setpoint value (U_set) for the output voltage of the DC-DC converter and a determined value (U_sek) for the output voltage of the DC-DC converter; and
  a feedforward control device (2), which is configured to generate a second controlled variable (R2) using the setpoint value (U_set) for the output voltage of the DC-DC converter, a determined value (U_prim) for the input voltage of the DC-DC converter and a determined value (I_DC) for an electrical current in the DC-DC converter,
  wherein the feedforward control device (2) is configured to adapt a dynamic response of the control system for the generation of the second controlled variable (R2) depending on the determined value (I_DC) for the electrical current in the DC-DC converter; and
  wherein the control device is configured to provide the combination (R) of the first controlled variable (R1) and the second controlled variable (R2) at the DC-DC converter module (4).

7. The DC-DC converter as claimed in claim 6, wherein the DC-DC converter comprises a plurality of DC-DC converter modules (4).

8. A method for the closed-loop control of a DC-DC converter, comprising the following steps:
  generating (S1) a first controlled variable (R1) using a setpoint value (U_set) for the output voltage of the DC-DC converter and a determined value (U_sek) for the output voltage of the DC-DC converter;
  generating (S2) a second controlled variable (R2) using the setpoint value (U_set) for the output voltage of the DC-DC converter, a determined value (U_prim) for the input voltage of the DC-DC converter and a determined value (I_DC) for an electrical current in the DC-DC converter; and
  providing (S3) a combination (R) of the first controlled variable (R1) and the second controlled variable (R2) at the DC-DC converter,
  wherein a dynamic response of the control system is adapted for the determination of the second controlled variable (R2) depending on the determined value (I_DC) for the electrical current in the DC-DC converter.

9. The method as claimed in claim 8, wherein the first controlled variable (R1) is generated by a voltage regulator (1), and the second controlled variable (R2) is generated by a feedforward control device (2).

* * * * *